United States Patent
Hua et al.

(10) Patent No.: US 8,824,168 B2
(45) Date of Patent: Sep. 2, 2014

(54) DYNAMICALLY ADJUSTING DRIVE SIGNALS FOR FULL BRIDGE PHASE SHIFTED CONVERTER AND CURRENT DOUBLER SYNCHRONOUS RECTIFIER

(75) Inventors: Chun-Ho Hua, New Taipei (TW); Chien-Wen Wang, New Taipei (TW); Wei-Liang Lin, New Taipei (TW)

(73) Assignee: Acbel Polytech Inc., New Taipei (TW)

( * ) Notice: Subject to any disclaimer, the term of this patent is extended or adjusted under 35 U.S.C. 154(b) by 444 days.

(21) Appl. No.: 13/237,118

(22) Filed: Sep. 20, 2011

(65) Prior Publication Data

US 2012/0120683 A1    May 17, 2012

(30) Foreign Application Priority Data

Nov. 17, 2010 (TW) .............................. 99139484 A (51) Int. Cl.
*H02M 3/335* (2006.01)
*H02M 7/5387* (2007.01)

(52) U.S. Cl.
CPC ........ *H02M 3/33592* (2013.01); *Y02B 70/1408* (2013.01); *H02M 2007/53878* (2013.01); *Y02B 70/1475* (2013.01)
USPC ................. 363/17; 363/89; 363/98

(58) Field of Classification Search
CPC ............ H02M 3/33507; H02M 7/217; H02M 7/53871
USPC .................................. 363/17, 89, 98
See application file for complete search history.

(56) References Cited

U.S. PATENT DOCUMENTS

| 6,388,898 B1 * | 5/2002 | Fan et al. ......... | 363/20 |
| 6,504,739 B2 * | 1/2003 | Phadke ........... | 363/127 |
| 6,560,127 B2 * | 5/2003 | Wittenbreder, Jr. ... | 363/17 |
| 2010/0232180 A1 * | 9/2010 | Sase et al. ....... | 363/17 |
| 2012/0120683 A1 * | 5/2012 | Hua et al. ....... | 363/17 |

* cited by examiner

*Primary Examiner* — Jeffrey Sterrett
(74) *Attorney, Agent, or Firm* — patenttm.us (57) ABSTRACT

A full bridge phase shifted power supply with synchronous rectification and current doubler and method for dynamically adjusting delay parameters thereof mainly have multiple delay parameter combinations respectively varying with multiple loads and embedded in a controller of the power supply. The delay parameter combinations serve to determine driving waveforms of two rectification switches of a synchronous rectification and current doubler circuit of the power supply. When the load of the power supply varies, the controller dynamically performs a corresponding delay parameter combination so as to vary the driving waveforms of the rectification switches of the synchronous rectification and current doubler circuit and enhance the operating efficiency of the power supply.

4 Claims, 9 Drawing Sheets

DYNAMICALLY ADJUSTING DRIVE SIGNALS FOR FULL BRIDGE PHASE SHIFTED CONVERTER AND CURRENT DOUBLER SYNCHRONOUS RECTIFIER

BACKGROUND OF THE INVENTION

1. Field of the Invention

The present invention relates to a power supply and a method for adjusting delay parameters thereof, and more particularly to a technique having multiple built-in delay parameter combinations in a controller of a full bridge phase shifted power supply with synchronous rectification and current doubler and dynamically applying the delay parameter combinations in accordance with the loading conditions.

2. Description of the Related Art

Figure 5:
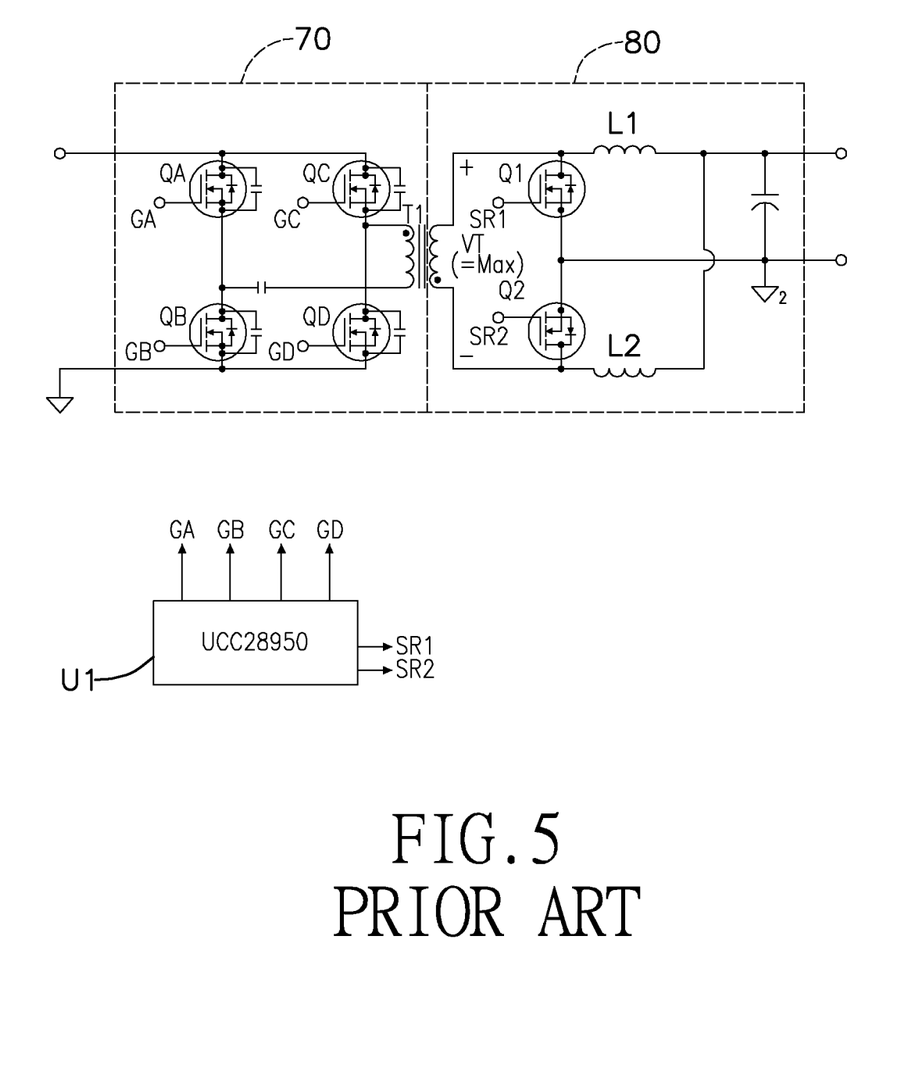
FIG. 5 is a circuit diagram of a conventional full bridge phase shifted power supply with synchronous rectification and current doubler.

With reference to FIG. 5, a conventional full bridge phase shifted power supply with synchronous rectification and current doubler has a transformer T1, a phase shifted full bridge converter 70 and a synchronous rectification and current doubler circuit 80. The phase shifted full bridge converter 70 is connected with the primary side of the transformer T1. The synchronous rectification current doubler circuit 80 is connected with the secondary side of the transformer T1.

The phase shifted full bridge converter 70 has a top switch QA on the leading leg, a bottom switch on the leading leg QB, a top switch on the lagging leg QC and a bottom switch on the lagging leg QD. The synchronous rectification and current doubler circuit 80 has a top rectification switch Q1, a bottom rectification switch Q2 and two output inductors L1 and L2. The top switch QA on the leading leg QA, the bottom switch on a leading leg QB, the top switch on a lagging leg QC, the bottom switch on a lagging leg QD, the top rectification switch Q1 and the bottom rectification switch Q2 are formed by MOSFETs. The gates GA, GB, GC, SR1 and SR2 are connected to a controller U1 and switched by the controller U1.

The top switch on the leading leg QA and the bottom switch on the lagging leg QD, and the bottom switch on the leading leg QB and the top switch on the lagging leg QC are alternatively turned on in pairs. For example, when the top switch on the leading leg QA and the bottom switch on the lagging leg QD are turned on, an induced positive voltage is generated by the secondary side of the transformer T1. Meanwhile, the top rectification switch Q1 is turned off, and the bottom rectification switch Q2 is turned on. The output inductors L1 and L2 are respectively formed in two current paths, and current of the secondary side of the transformer T1 is equal to current flowing through the output inductor L1, which is one half of an output current. The other half of output current is provided by the output inductor L2 to constitute a current doubler according to the flywheel effect.

The top rectification switch Q1 and the bottom rectification switch Q2 of the synchronous rectification and current doubler circuit 80 are driven in collaboration with the top switch QA on the leading leg and the bottom switch on the leading leg QB. Here is an example for driving the bottom rectification switch Q2.

Figure 6:
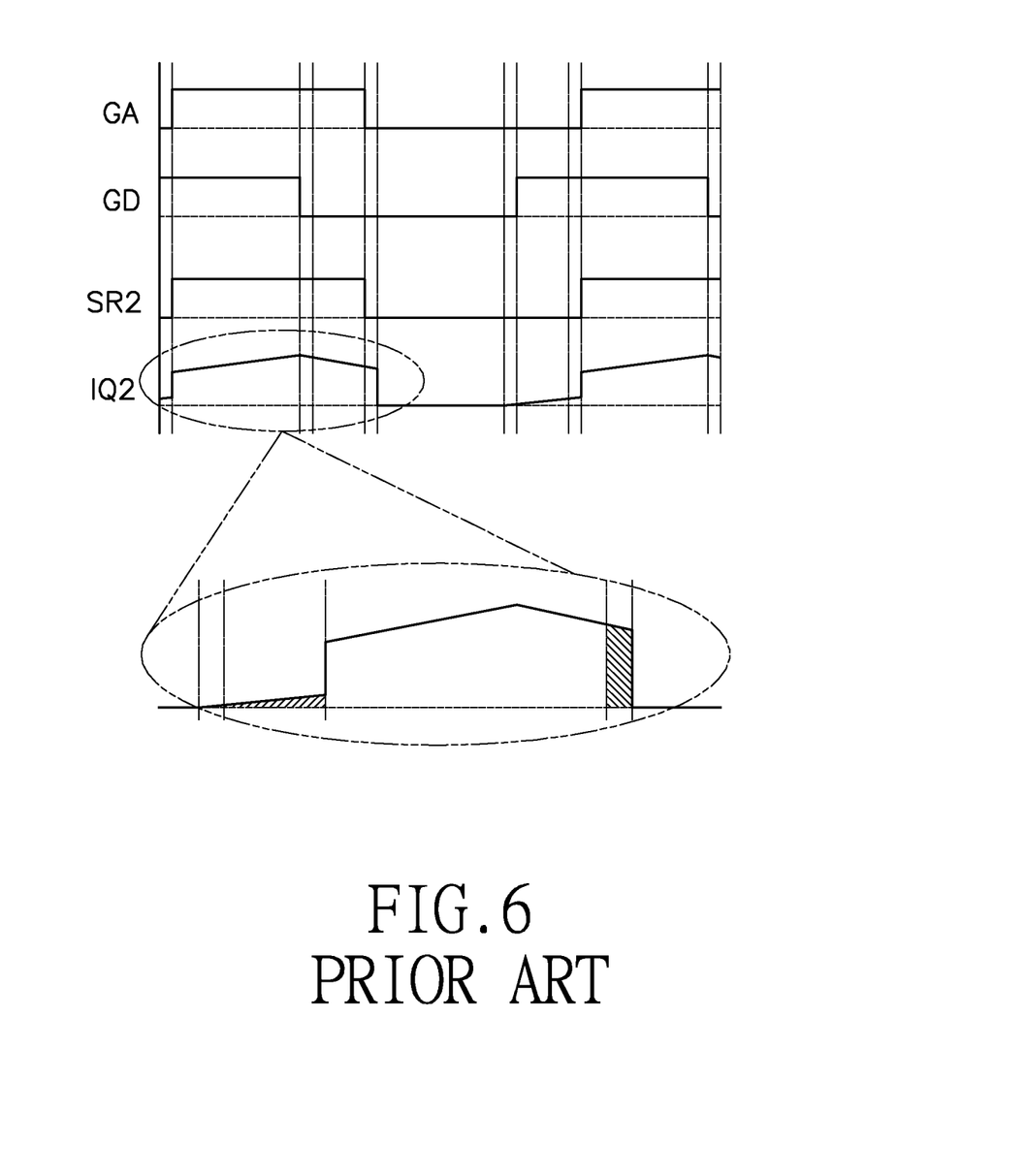
FIG. 6 is a waveform diagram of driving signals of the conventional full bridge phase shifted power supply.

With reference to FIG. 6, a driving signal applied to the gate SR2 of the bottom rectification switch Q2 is shown. The waveform of the driving signal is identical to that applied to the gate GA of the top switch on the leading leg QA. In other words, the signal (GA) driving the top switch QA on the leading leg can be used to drive the bottom rectification switch Q2. When the bottom rectification switch Q2 is turned off and the top rectification switch Q1 is turned on, a dead time should be added. However, circulating current is forced to pass through a body diode of the turned off bottom rectification switch Q2 during the dead time. IQ2 represents a current passing through the bottom rectification switch Q2. Slash portions prior to transitions represent current passing through the body diode of the bottom rectification switch Q2 when Q2 is turned off. Current passing through the body diode of a turned off switch can damage the switch and further lowers an operating efficiency of the power supply.

Figure 7:
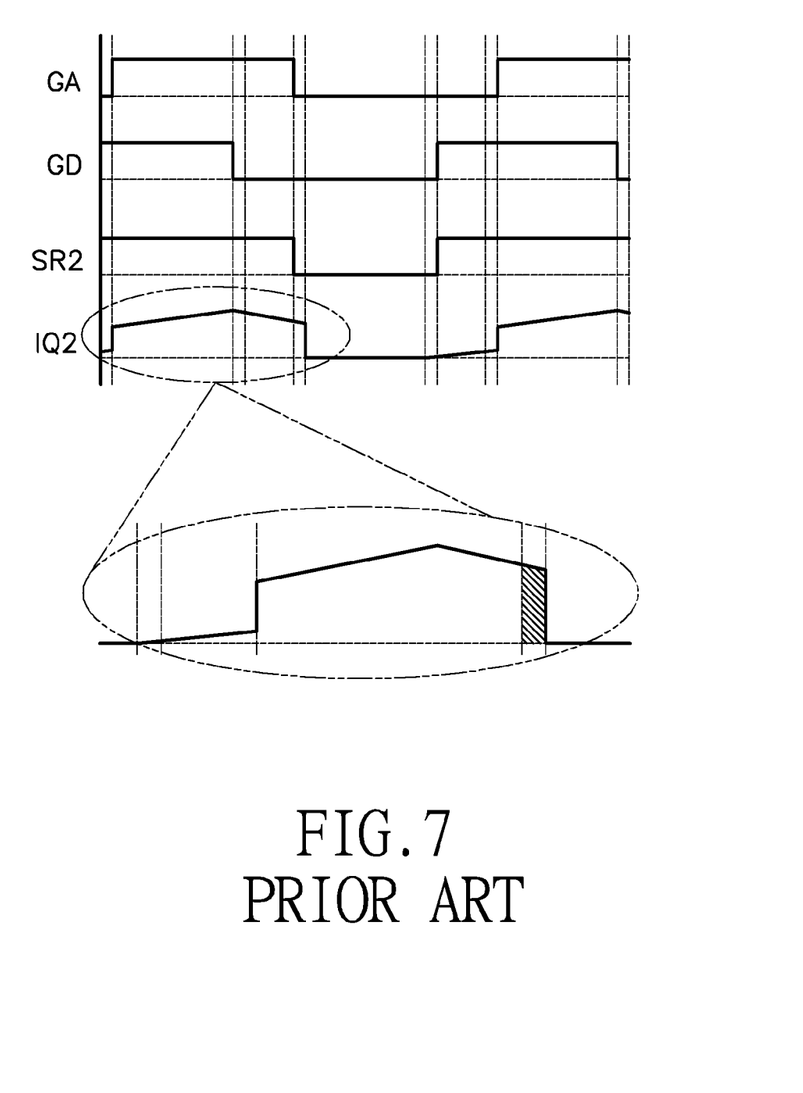
FIG. 7 is another waveform diagram of driving signals of the conventional full bridge phase shifted power supply.

Another method driving the top rectification switch Q1 and the bottom rectification switch Q2 is described in the following (still using the example of driving the bottom rectification switch Q2). With reference to FIG. 7, such method applies a result of a logical operation "OR" of the driving signals GA and GD to drive the bottom rectification switch Q2. Under the circumstance, current passing through the body diode of Q2 before Q2 transitions from an off state to an on state can be reduced. However, current passing through the body diode of Q2 before Q2 transitions from an on state to an off state still exists and thus damages Q2 and affects an operating efficiency of the power supply accordingly.

It can be seen from the aforementioned two driving methods that circulating current passes through the body diode of Q2 when Q2 is turned off, and the second method prolongs the time that Q2 is turned on or makes rising edges at transition ahead of time. The second method further associates with a change of delay parameters.

Figure 8:
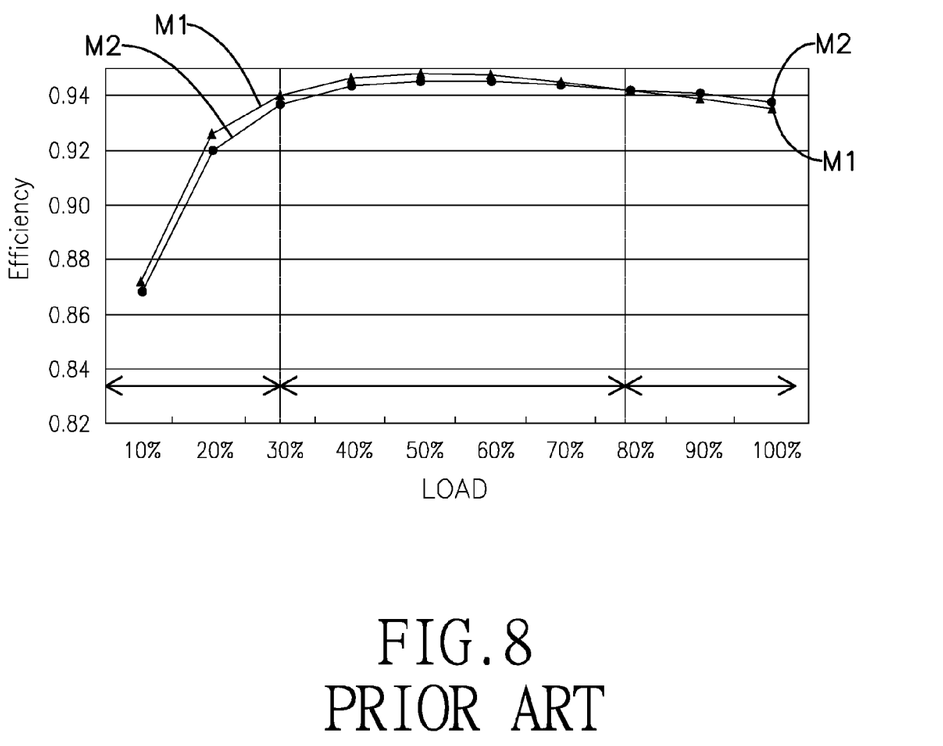
FIG. 8 is a characteristic curve associated with operating efficiencies of the conventional full bridge phase shifted power supply.

As discussed, when the top rectification switch Q1 and the bottom rectification switch Q2 are driven by the second method, current does not pass through the body diode of Q1 and Q2 before Q1 and Q2 transition from the off state to the on state. However, the second method is not applicable for driving Q1 and Q2 under all circumstances. With reference to FIG. 8, a characteristic curve illustrating loads and operating efficiencies of a full bridge phase shifted power supply with synchronous rectification and current doubler is shown. The horizontal axis represents loads applied to the full bridge phase shifted power supply, is expressed by percentage, and is divided into three zones, namely 0~30% for the first zone, 30%~80% for the second zone, and 80% and up for the third zone. The vertical axis represents operating efficiencies of the full bridge phase shifted power supply. M1 is a characteristic curve generated by using the first method to drive the synchronous rectification and current doubler circuit 80, and M2 is a characteristic curve generated by using the second method to drive the synchronous rectification and current doubler circuit 80. It is noted that the operating efficiencies using the first driving method are better than those using the second driving method when subjected to loads being less than 30%, while the operating efficiencies using the second driving method are better than those using the first driving method when subjected to loads being 80% and up.

From the foregoing comparison, the delay parameters associated with Q1 and Q2 of the synchronous rectification and current doubler circuit 80 affect the operating efficiency of the power supply in a certain degree or even according to an interaction effect. Therefore, how to adjust the delay parameters to enhance the operating efficiency of the power supply needs to be further explored to find a feasible solution.

SUMMARY OF THE INVENTION

An objective of the present invention is to provide a method for dynamically applying delay parameters embedded in a full bridge phase shifted power supply with synchronous rectification and current doubler in accordance with the loading conditions of the power supply.

To achieve the foregoing objective, the method for dynamically adjusting delay parameters applied to a full bridge phase shifted power with synchronous rectification and current doubler. The power supply has a transformer, a phase shifted full bridge converter, a synchronous rectification and current doubler circuit and a controller. The transformer has a primary side and a secondary side. The phase shifted full bridge converter is connected with the primary side of the transformer and has four switches switched in pairs. The synchronous rectification and current doubler circuit is connected with the secondary side of the transformer and has two rectification switches. The controller switches the switches and the rectification switches and is embedded with a delay parameter adjusting process. The method has steps of:

provide multiple combinations of delay parameters, wherein each combination of delay parameters has a first delay parameter and a second delay parameter and corresponds to a load;

determining a load of the power supply;

selecting and performing a corresponding combination of delay parameters according to the load to drive the rectification switches of the synchronous rectification and current doubler circuit;

determining if the load of the power supply is varied; and when the load of the power is varied, selecting and performing a corresponding combination of delay parameters according to the varied load to drive the rectification switches of the synchronous rectification and current doubler circuit.

The method of the present invention targets at determining the delay parameter combinations for driving signals of the rectification switches of the synchronous rectification and current doubler circuit. As each delay parameter combination is an optimized combination and has two delay parameters to be assigned to a load, the operating efficiency of the power supply at the load can be effectively enhanced.

Other objectives, advantages and novel features of the invention will become more apparent from the following detailed description when taken in conjunction with the accompanying drawings.

DETAILED DESCRIPTION OF THE INVENTION

Figure 1A:
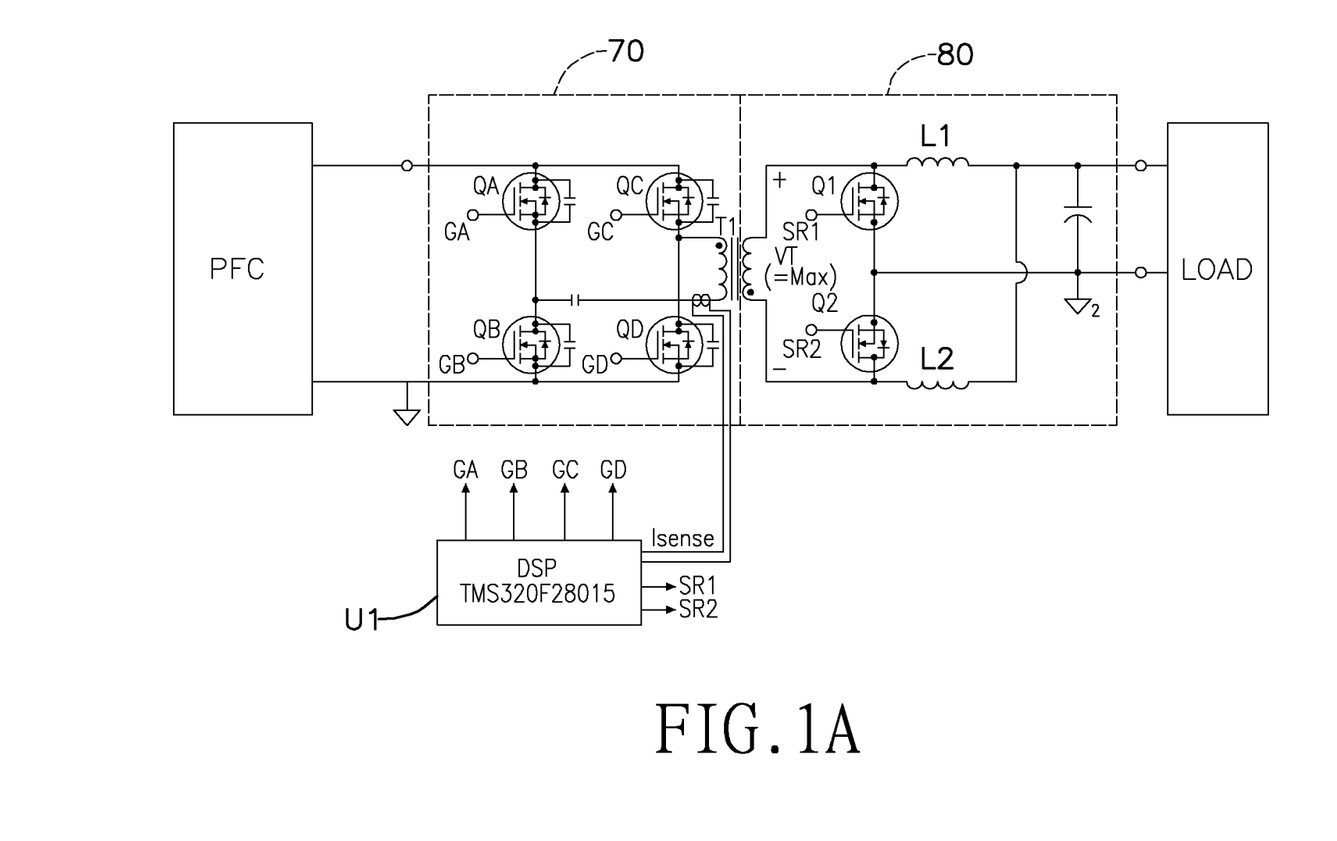
FIG. 1A is a circuit diagram of a full bridge phase shifted power supply with synchronous rectification and current doubler in accordance with the present invention when the power supply detects a load from a primary side of a transformer.
Figure 1B:
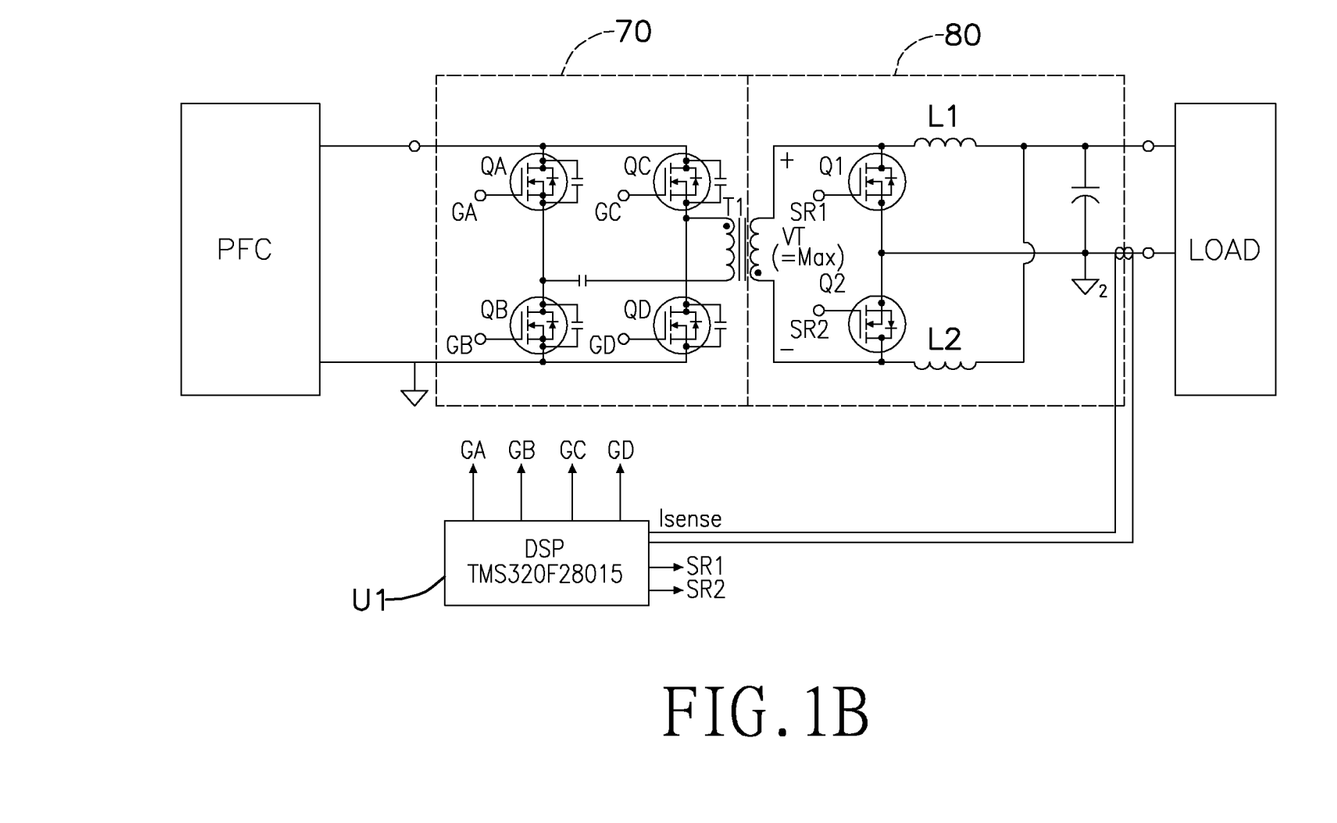
FIG. 1B is a circuit diagram of a full bridge phase shifted power supply with synchronous rectification and current doubler in accordance with the present invention when the power supply detects a load from an output terminal of a synchronous rectification and current doubler circuit.

With reference to FIGS. 1A and 1B, a full bridge phase shifted power supply with synchronous rectification and current doubler has a transformer T1, a phase shifted full bridge converter 70, a synchronous rectification and current doubler circuit 80 and a controller U1. The phase shifted full bridge converter 70 has a top switch on the leading leg QA, a bottom switch on the leading leg QB, a top switch on the lagging leg QC and a bottom switch on the lagging leg QD. The synchronous rectification and current doubler circuit 80 has a top rectification switch Q1, a bottom rectification switch Q2 and two output inductors L1 and L2. The switching of the top switch on the leading leg QA, the bottom switch on the leading leg QB, the top switch on the lagging leg QC, the bottom switch on the lagging leg QD, the top rectification switch Q1 and the bottom rectification switch Q2 are controlled by the controller U1. The controller U1 has a load detection terminal "Isense" connected to a primary side of the transformer T1 through a current transformer as shown in FIG. 1A, or connected to an output terminal of the synchronous rectification and current doubler circuit 80. After the power supply is connected to a load, the controller U1 detects a current signal varying with the load through the load detection terminal "Isense" and further detects a load condition.

The controller U1 has a lookup table embedded therein and providing multiple delay parameter combinations. Each delay parameter combination has a first delay parameter and a second delay parameter so that the controller U1 can select different delay parameter combinations according to the load condition to respectively drive the top rectification switch Q1 and the bottom rectification switch Q2 of the synchronous rectification and current doubler circuit 80. Generation of the delay parameter combinations of the lookup table is described as follows.

Figure 2:
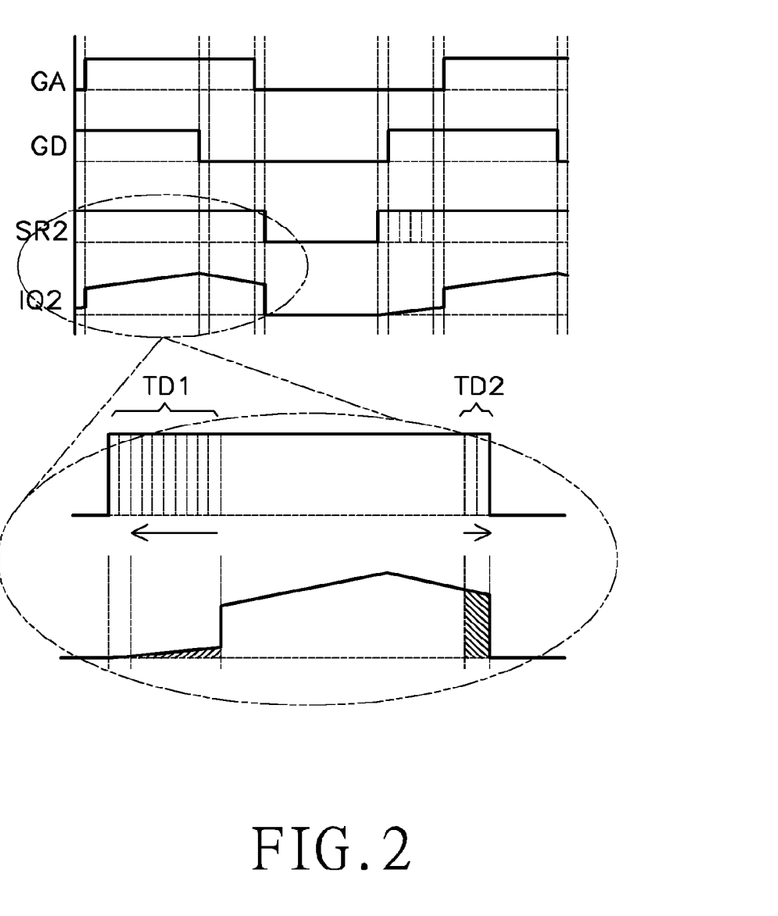
FIG. 2 is a waveform diagram of driving signals of the full bridge phase shifted power supply in FIG. 1A or 1B.

With reference to FIG. 2, a waveform diagram of driving signals of the controller U1 for driving the top switch on the leading leg QA (GA), the bottom switch on the lagging leg QD (GD) and the top rectification switch Q2 (SR2) is shown. The IQ2 represents current flowing through the bottom rectification switch Q2. A technical solution of the present invention lets the driving signal SR2 to the gate of the bottom rectification switch Q2 have a first delay parameter TD1 and a second delay parameter TD2. The first delay parameter TD1 represents a time ahead of a rising edge of each square wave of the driving signal. The second delay parameter TD2 represents a time behind a falling edge of each square wave of the driving signal. TD1 and TD2 are associated with the driving waveform of the top switch on the leading leg QA (GA). It can be seen that the rising edge of each square wave of the driving waveform of the bottom rectification switch Q2 is ahead of time when compared with the driving waveform of QA (GA). TD1 is not a constant or can be adjustable. It can also been seen that the falling edge of each square wave of the driving waveform of the bottom rectification switch Q2 is behind time when compared with the driving waveform of QA (GA). TD2 is also not a constant and can be adjustable.

As known from the foregoing description, TD1 and TD2 affect the operating efficiency of the power supply and depend on the load. Different combinations of TD1 and TD2 can be applied to different loads so that TD1 and TD2 can be used to respectively drive the top rectification switch Q1 and the bottom rectification switch Q2 to enhance the operating efficiency of the power supply. Before adjusting the delay parameters, an optimized combination of delay parameters for each load needs to be determined. A method for determining the optimized combination of delay parameters is described as follows.

Figure 3:
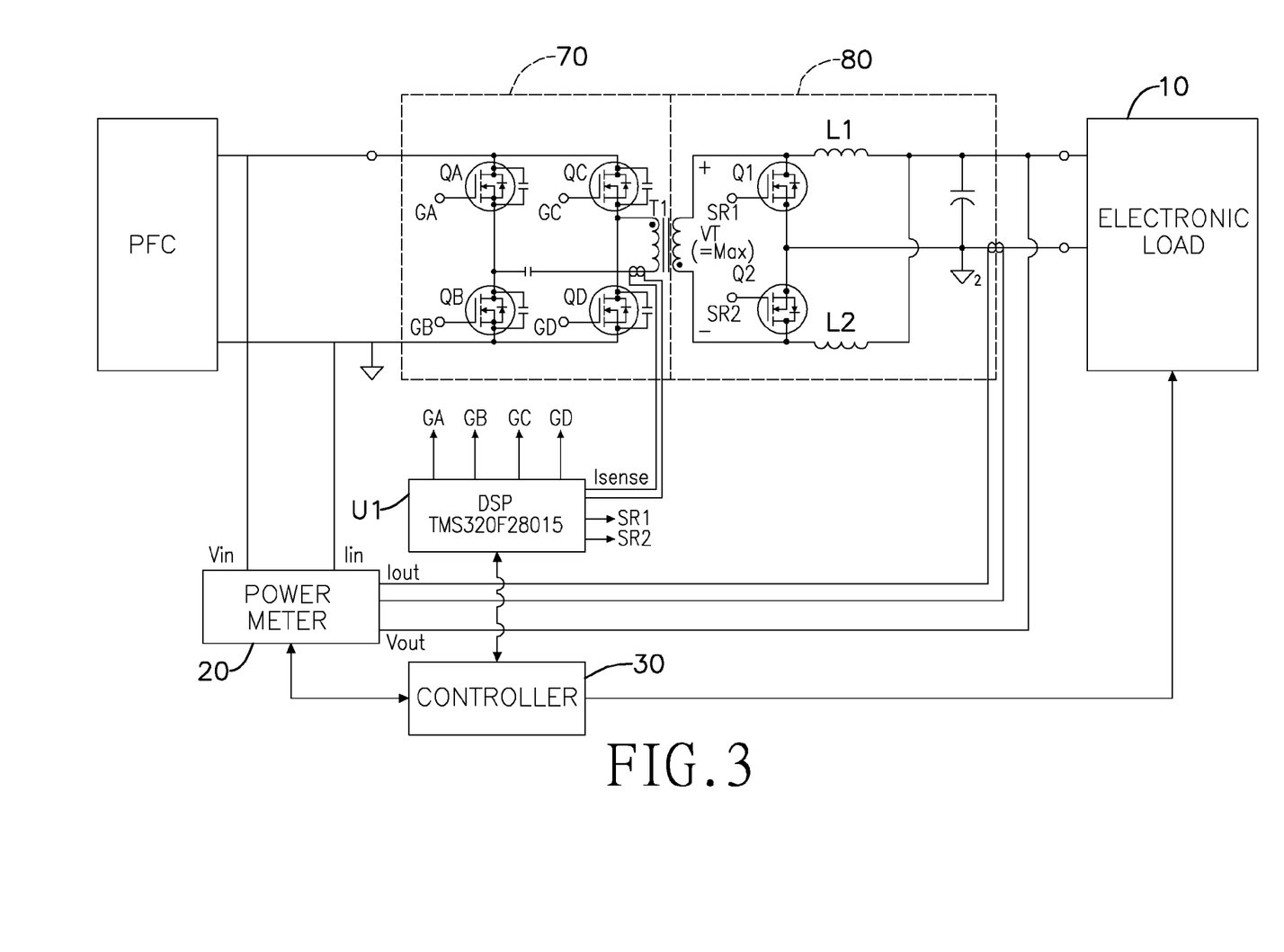
FIG. 3 is a circuit diagram of the full bridge phase shifted power supply in FIG. 1A when the power supply detects operating efficiencies thereof under various loads.

With reference to FIG. 3, an electronic load 10 is connected with the output terminal of the synchronous rectification current doubler circuit 80 of the full bridge phase shifted power supply, and a power meter 20 is connected with the input terminal of the phase shifted full bridge converter 70 and the output terminal of the synchronous rectification current doubler circuit 80 to obtain an input voltage Vin and an input current Iin of the phase shifted full bridge converter 70 and an output voltage Vout and an output current Tout of the power supply. The electronic load 10 and the power meter 20 are connected with a controller 30. The controller 30 controls the electronic load 10 to vary the load of the power supply, such as 10%, 20%, . . . and 100% of a full load capacity of the electronic load. When the load of the power supply varies, the controller 30 can calculate the operating efficiency corresponding to the varied load.

The method for determining TD1 and TD2 can be referred to the following table (value and unit of TD1 and TD2 in the following table are all assumed)

|  | TD1 | | | | | |
| --- | --- | --- | --- | --- | --- | --- |
| TD2 | 0 ms | 1 ms | 2 ms | 3 ms | 4 ms | 5 ms |
| 0 ms | 0, 0 | 1, 0 | 2, 0 | 3, 0 | 4, 0 | 5, 0 |
| 1 ms | 1, 0 | 1, 1 | 2, 1 | 3, 1 | 4, 1 | 5, 1 |
| 2 ms | 2, 0 | 1, 2 | 2, 2 | 3, 2 | 4, 2 | 5, 2 |
| 3 ms | 3, 0 | 1, 3 | 2, 3 | 3, 3 | 4, 3 | 5, 3 |
| 4 ms | 4, 0 | 1, 4 | 2, 4 | 3, 4 | 4, 4 | 5, 4 |
| 5 ms | 5, 0 | 1, 5 | 2, 5 | 3, 5 | 4, 5 | 5, 5 |

The above table has multiple combinations of delay parameters. Let the first delay parameter TD1 and the second delay parameter TD2 be variables in a unit of millisecond (ms). Given (2, 3) as an example of a combination of delay parameters, 2 in the combination indicates that TD1 is 2 ms ahead of the rising edge of each square wave of the driving signal, and 3 in the combination indicates that TD2 is 3 ms behind the falling edge of each square wave of the driving signal.

All the combinations of delay parameters can be used by the controller U1 to sequentially drive the top rectification switch Q1 and the bottom rectification switch Q2 of the synchronous rectification and current doubler circuit 80 under a selected load. The controller 30 then detects the operating efficiency for each combination of delay parameters under the selected load.

For example, the controller 30 selects 10% of the full load capacity of the electronic load as an increment and instructs the electronic load to vary by adding the increment one at a time. When the electronic load is at 10% of its full load capacity, the controller U1 first drives Q1 and Q2 with the combination of delay parameters (0, 0), i.e. TD1=TD2=0, and detects a value of the operating efficiency of the power supply through the power meter 20 and records the value of the operating efficiency in the following table.

|  | TD1 | | | | | |
| --- | --- | --- | --- | --- | --- | --- |
| TD2 | 0 ms | 1 ms | 2 ms | 3 ms | 4 ms | 5 ms |
| 0 ms | Efficiency value | | | | | |
| 1 ms | | | | | | |
| 2 ms | | | | | | |
| 3 ms | | | | | | |
| 4 ms | | | | | | |
| 5 ms | | | | | | |

The controller U1 further sequentially drives Q1 and Q2 with the rest of the combinations of delay parameters in the above table, and detects and records corresponding values of the operating efficiency when the electronic load is at 10% of its full load capacity. Once all the combinations are completed, the controller U1 varies the electronic load to 20% of its full load capacity, repeats the foregoing steps to complete all the combinations of delay parameters, and records corresponding values of the operating efficiency. The controller U1 keeps incrementing to vary the electronic load and repeats the foregoing steps with the incremented load until all configured loads are selected.

After completing the foregoing steps, an optimized value among all recorded values of the operating efficiency in each table corresponding to a selected load can be found, and in turn an optimized combination of delay parameters corresponding to the optimized value of the operating efficiency can be identified.

With the recorded values of the operating efficiency in the tables corresponding to 10%, 20%, . . . and 100% of the full load capacity of the electronic load, values of the operating efficiency in the tables corresponding to 10%~20%, 20%~30%, . . . and 90%~100% of the full load capacity of the electronic load can be obtained by using the interpolation method. Given a load range of 10%~20% of the full load capacity of the electronic load and an increment 1% as an example, values of the operating efficiency in the tables corresponding to 11%, 12%, . . . and 19% can be obtained by using the interpolation method. The optimized values of the operating efficiency in the tables corresponding to 11%, 12%, . . . and 19% can be found. In turn the optimized combination of delay parameters corresponding to each optimized value can be identified. The values of the operating efficiency and the optimized combination of delay parameters of each table recorded after the interpolations are built in the controller U1.

Regarding how the combination of delay parameters can be practically applied, a feasible embodiment can be described as follows.

Figure 4:
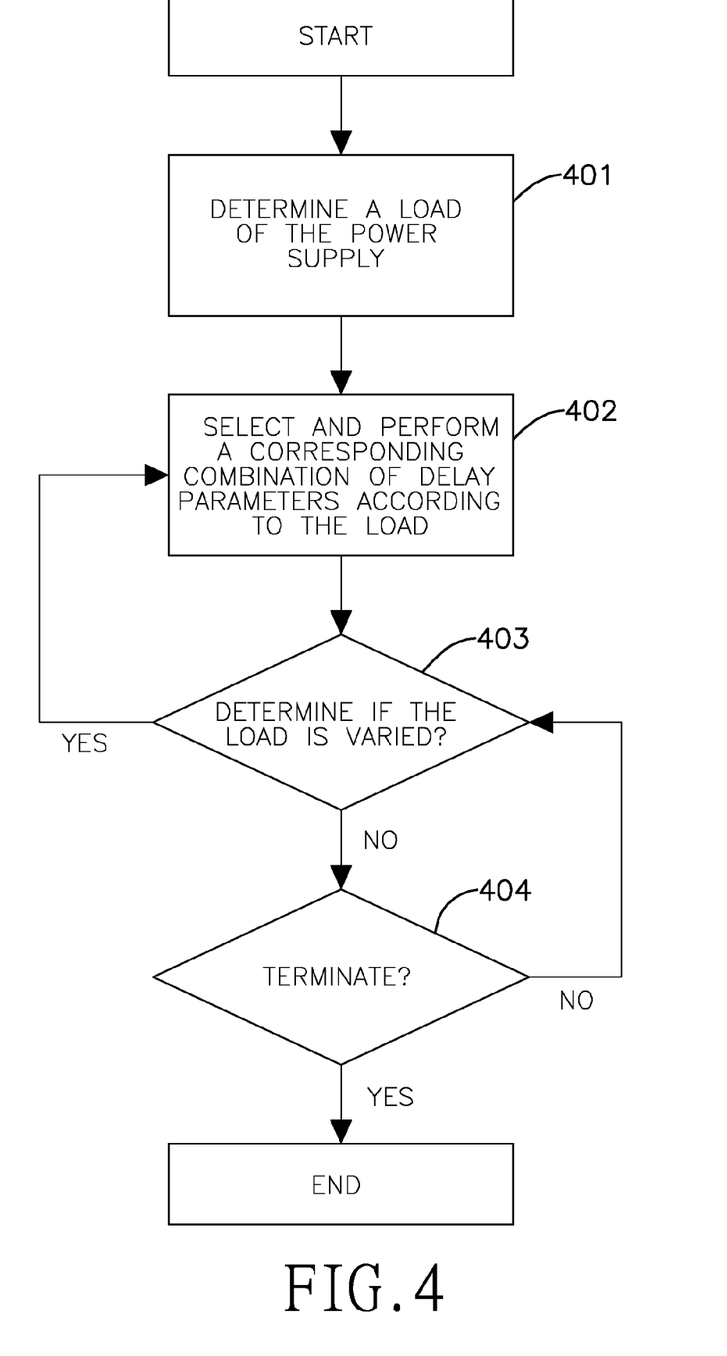
FIG. 4 is a flow diagram of a method for dynamically adjusting delay parameters of a full bridge phase shifted power supply with synchronous rectification and current doubler in accordance with the present invention.

Assign multiple loads, such as 30% and down, 30%~80% and 80% and up of the full load capacity of the electronic load, and with reference to FIG. 4, let the controller U1 perform the following steps of determining a load of the power supply (401);

selecting and performing a corresponding combination of delay parameters according to the load (402) to drive the rectification switches of the synchronous rectification and current doubler circuit;

determining if the load of the power supply is varied (403);

resuming Step (402) when the load of the power is varied, and selecting and performing a corresponding combination of delay parameters according to the varied load to drive the rectification switches of the synchronous rectification and current doubler circuit; and determining to terminate if the load remains the same (404), or resuming Step (403) if the load is varied.

The above method can be applied to dynamically determine the delay parameters for switching the rectification switches of the synchronous rectification and current doubler circuit, thereby effectively enhancing the operating efficiency of the power supply.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for dynamically adjusting delay parameters applied to a full bridge phase shifted power supply with synchronous rectification and current doubler that has a transformer with a primary side and a secondary side, a phase shifted full bridge converter connected with the primary side of the transformer and having a top switch and a bottom switch on a leading leg and a top switch and a bottom switch on a lagging leg switched in pairs, a synchronous rectification and current doubler circuit connected with the secondary side of the transformer and having two rectification switches, and a controller switching the top switch and the bottom switch on the leading leg, the top switch and the bottom switch on the lagging leg, and the rectification switches, and the controller embedded with a delay parameter adjusting process, the method comprising steps of:

providing multiple combinations of delay parameters, wherein each combination of delay parameters has a first delay parameter and a second delay parameter and the combinations of delay parameters correspond to a range of a load, the first delay parameter represents a time ahead of a rising edge of a driving signal of the top switch on the leading leg, the second delay parameter represents a time behind a falling edge of the driving signal of the top switch on the leading leg, and a corresponding driving signal of the rectification switches is generated by adjusting the rising edge and the falling edge of the driving signal of the top switch on the leading leg according to the first delay parameter and the second delay parameter;

determining a present load of the power supply selected from the range of the load;

selecting a corresponding combination of delay parameters according to the present load to drive the rectification switches of the synchronous rectification and current doubler circuit with the driving signal of the rectification switches adjusted according to the selected combination of delay parameters;

determining if the present load of the power supply is varied; and when the present load of the power supply is varied, resuming the step of selecting a corresponding combination of delay parameters.

2. A full bridge phase shifted power supply with synchronous rectification and current doubler, comprising:

a transformer having a primary side and a secondary side;

a phase shifted full bridge converter connected with the primary side of the transformer and having a top switch and a bottom switch on a leading leg and a top switch and a bottom switch on a lagging leg switched in pairs;

a synchronous rectification and current doubler circuit connected with the secondary side of the transformer and having two rectification switches; and a controller switching the top switch and the bottom switch on the leading leg, the top switch and the bottom switch on the lagging leg, and the rectification switches;

wherein the controller has a load detection terminal for detecting a present load selected from a range of a load, is embedded with a lookup table providing multiple combinations of delay parameters corresponding to the range of the load, each combination of delay parameters has a first delay parameter and a second delay parameter, the first delay parameter represents a time ahead of a rising edge of a driving signal of the top switch on the leading leg, and the second delay parameter represents a time behind a falling edge of the driving signal of the top switch on the leading leg, a driving signal of the rectification switches is generated by adjusting the rising edge and the falling edge of each square wave of the driving signal of the top switch on the leading leg according to the first delay parameter and the second delay parameter of the delay parameter combination, and the controller selects a corresponding combination of delay parameters according to the detected present load to drive the rectification switches of the synchronous rectification and current doubler circuit with the driving signal of the rectification switches.

3. The full bridge phase shifted power supply with synchronous rectification and current doubler as claimed in claim 2, wherein the load detection terminal of the controller is connected to the primary side of the transformer through a current transformer.

4. The full bridge phase shifted power supply with synchronous rectification and current doubler as claimed in claim 2, wherein the load detection terminal of the controller is connected to an output terminal of the synchronous rectification and current doubler circuit through a current transformer.

* * * * *